United States Patent
Suraci et al.

(10) Patent No.: US 12,308,744 B2
(45) Date of Patent: May 20, 2025

(54) ADAPTIVE CURRENT LIMITER

(71) Applicant: Allegro MicroSystems, LLC, Manchester, NH (US)

(72) Inventors: Michele Suraci, Turate (IT); Giorgio Oddone, Aosta (IT); Paolo Selvo, Milan (IT)

(73) Assignee: Allegro MicroSystems, LLC, Manchester, NH (US)

( * ) Notice: Subject to any disclaimer, the term of this patent is extended or adjusted under 35 U.S.C. 154(b) by 336 days.

(21) Appl. No.: 18/049,836

(22) Filed: Oct. 26, 2022

(65) Prior Publication Data
US 2024/0146196 A1 May 2, 2024

(51) Int. Cl.
*H02M 3/158* (2006.01)
*H02M 1/00* (2006.01)

(52) U.S. Cl.
CPC ........ *H02M 3/1582* (2013.01); *H02M 1/0025* (2021.05)

(58) Field of Classification Search
CPC .......................................... H02M 3/155–1588
See application file for complete search history.

(56) References Cited

U.S. PATENT DOCUMENTS

| | | | |
|---|---|---|---|
| 6,984,967 B2 | 1/2006 | Notman | |
| 7,649,325 B2 | 1/2010 | McIntosh et al. | |
| 9,291,478 B2 | 3/2016 | Contaldo et al. | |
| 9,614,428 B2 | 4/2017 | Garvey et al. | |
| 9,621,036 B2 | 4/2017 | Wibben | |
| 9,621,041 B2 | 4/2017 | Sun et al. | |
| 10,181,791 B2 | 1/2019 | Kesarwani et al. | |
| 10,386,882 B2 | 8/2019 | Kesarwani | |
| 10,811,961 B1 | 10/2020 | Ross et al. | |
| 11,469,666 B2 | 10/2022 | Kesarwani et al. | |
| 2007/0252567 A1* | 11/2007 | Dearn ................... | H02M 3/156 323/282 |
| 2014/0176106 A1* | 6/2014 | Toosky ................ | H02M 3/158 323/285 |
| 2017/0054363 A1 | 2/2017 | Mangtani et al. | |

OTHER PUBLICATIONS

U.S. Appl. No. 17/510,759, filed Oct. 26, 2021, Suraci, et al.
U.S. Appl. No. 17/371,281, filed Jul. 9, 2021, Georgievski, et al.
Allegro MicroSystems LLC Datasheet "A81407—Multi-Output Regulator with Buck or Buck-Boost Pre-Regulator, 4× LDO Outputs, Watchdog, 4× Gate Drivers, and SPI", Feb. 1, 2021, 58 pages.

* cited by examiner

*Primary Examiner* — Peter M Novak
(74) *Attorney, Agent, or Firm* — DALY, CROWLEY, MOFFORD & DURKEE, LLP (57) ABSTRACT

An adaptive current limit circuit is provided in a power converter to achieve a fixed output current limit over duty cycle. In a converter including a high side switch, a low side switch coupled to the high side switch at a switch node, and an inductor coupled between an input voltage source and the switch node, the adaptive current limit circuit is coupled to receive the high side control signal and configured to generate an adaptive current limit threshold that varies based at least in part on the duty cycle of the high side switch.

23 Claims, 11 Drawing Sheets

ADAPTIVE CURRENT LIMITER

FIELD

This disclosure relates generally to an adaptive current limiter and, more particularly to an adaptive current limiter for a power converter.

BACKGROUND

Converters are used in a wide range of applications to provide a regulated output voltage and/or current from a battery or other power source to a load. Switch-mode or switching converters use an energy storage device, such as an inductor, to store the input energy and switches to selectively couple the energy storage device to the output.

Common switching converter topologies include Buck, Boost, and Buck-Boost. In Buck converters, the output voltage is lower than the input voltage, in Boost converters, the output voltage is higher than the input voltage, and in Buck-Boost converters, the output voltage can be either higher or lower than the input voltage. Boost converters are governed by the transfer function Vout=Vin/(1−D), where D is the duty cycle of the low side power switch.

Power converters often include circuits and techniques to limit the output voltage, current, and/or power to a specified, safe level. For example, current limit methodologies to limit the converter output current can include sensing the output current, comparing the sensed current to a threshold signal, and controlling the power switch operation (e.g., duty cycle) and thus, the inductor current level in order to ensure that the inductor current remains at a level sufficient to limit the output current as desired.

SUMMARY

Described herein are systems and techniques for limiting a current in a circuit using an adaptive current limit. For example, a power converter can include an adaptive current limit circuit that is configured to maintain an output (e.g., load) current $I_O$ of the power converter at or below a particular output current limit level $I_{Olim}$. The power converter can include an inductor coupled to an input voltage source. A current through the inductor $I_L$ can be monitored and a signal indicative of the current through the inductor can be compared to an adaptive current limit threshold $I_{Llim}$ that is generated by the adaptive current limit circuit. Based on the comparison, the power converter can adjust the duty cycle of switches coupled to the inductor to maintain the inductor current $I_L$ at or below the adaptive current limit threshold $I_{Llim}$. If the signal indicative of the current through the inductor indicates that the inductor current $I_L$ exceeds the adaptive current limit threshold $I_{Llim}$, the duty cycles of the connected switches can be adjusted to cause the inductor current $I_L$ to decrease. The adaptive current limit threshold $I_{Llim}$ is configured to adapt (e.g., change) based at least in part on the duty cycle such that the output current limit level $I_{Olim}$ remains fixed, and the power converter limits the output current $I_O$ at or below the output current limit level $I_{Olim}$. In some implementations, the output current limit level $I_{Olim}$ is a predetermined value that is chosen depending on the particular application, or a value that can be programmed by a user/customer using associated circuitry.

According to the disclosure, in an aspect, in a converter including a high side switch, a low side switch coupled to the high side switch at a switch node, and an inductor coupled between an input voltage source and the switch node, the converter includes a driver configured to generate a high side control signal for controlling the high side switch at a duty cycle and a low side control signal for controlling the low side switch at a duty cycle complementary with respect to the duty cycle of the high side switch, and an adaptive current limit circuit coupled to receive the high side control signal and configured to generate an adaptive current limit threshold that varies based at least in part on the duty cycle.

Implementations can include one or more of the following features, alone or in combination.

In some implementations, the adaptive current limit circuit includes a load current limit reference generator configured to generate a reference current at a level indicative of an output current limit level, a switch operable to turn on and off at the duty cycle and coupled to the load current limit reference generator at a feedback node, a compensation network having an input coupled to the feedback node and an output at which a compensation voltage is provided, and a current source coupled to receive the compensation voltage and generate a current $I_x$ based on the compensation voltage, wherein an average value of the current $I_x$ is equal to the reference current.

In some implementations, the adaptive current limit circuit is configured to extract information related to the current $I_x$ and generate the adaptive current limit threshold based on the extracted information.

In some implementations, the current $I_x$ is a square wave, and the adaptive current limit threshold has a value equal to a high value of the square wave.

In some implementations, the compensation network includes an integrator.

In some implementations, the integrator includes two integrator stages.

In some implementations, the reference current is a scaled down version of the output current limit level.

In some implementations, the reference current is equal to the output current limit level.

In some implementations, the switch is a Field Effect Transistor (FET).

In some implementations, the converter includes a comparator configured to compare the adaptive current limit threshold to a signal indicative of a current through the inductor and generate a current limit signal.

In some implementations, the current limit signal is coupled to the driver and the driver is configured to adjust the duty cycle in response to the current limit signal.

In some implementations, the signal indicative of the current through the inductor corresponds to a current through the high side switch when the high side switch is on.

In some implementations, the converter is a Boost converter or a Buck-Boost converter.

In another aspect, a method includes generating a high side control signal for controlling a high side switch at a duty cycle and a low side control signal for controlling a low side switch at a duty cycle complementary with respect to the duty cycle of the high side switch, receiving the high side control signal and generating an adaptive current limit threshold that varies based at least in part on the duty cycle.

Implementations can include one or more of the following features, alone or in combination.

In some implementations, the method includes generating a reference current at a level indicative of an output current limit level, receiving a compensation voltage for controlling a current source, and generating a current $I_x$ based on the compensation voltage. An average value of the current L is equal to the reference current.

In some implementations, the method includes extracting information related to the current $I_x$ and generating the adaptive current limit threshold based on the extracted information.

In some implementations, the current $I_x$ is a square wave, and the adaptive current limit threshold has a value equal to a high value of the square wave.

In some implementations, the compensation voltage is received from a compensation network that includes an integrator.

In some implementations, the integrator includes two integrator stages.

In some implementations, the reference current is a scaled down version of the output current limit level.

In some implementations, the reference current is equal to the output current limit level.

In some implementations, the method includes comparing the adaptive current limit threshold to a signal indicative of a current through the inductor and generating a current limit signal.

In some implementations, the method includes adjusting the duty cycle in response to the current limit signal.

In some implementations, the signal indicative of the current through the inductor corresponds to a current through the high side switch when the high side switch is on.

In some implementations, the converter is a Boost converter or a Buck-Boost converter.

DESCRIPTION OF THE DRAWINGS

The foregoing features may be more fully understood from the following description of the drawings. The drawings aid in explaining and understanding the disclosed technology. Since it is often impractical or impossible to illustrate and describe every possible embodiment, the provided figures depict one or more illustrative embodiments. Accordingly, the figures are not intended to limit the scope of the broad concepts, systems and techniques described herein. Like numbers in the figures denote like elements.

DETAILED DESCRIPTION

Figure 1:
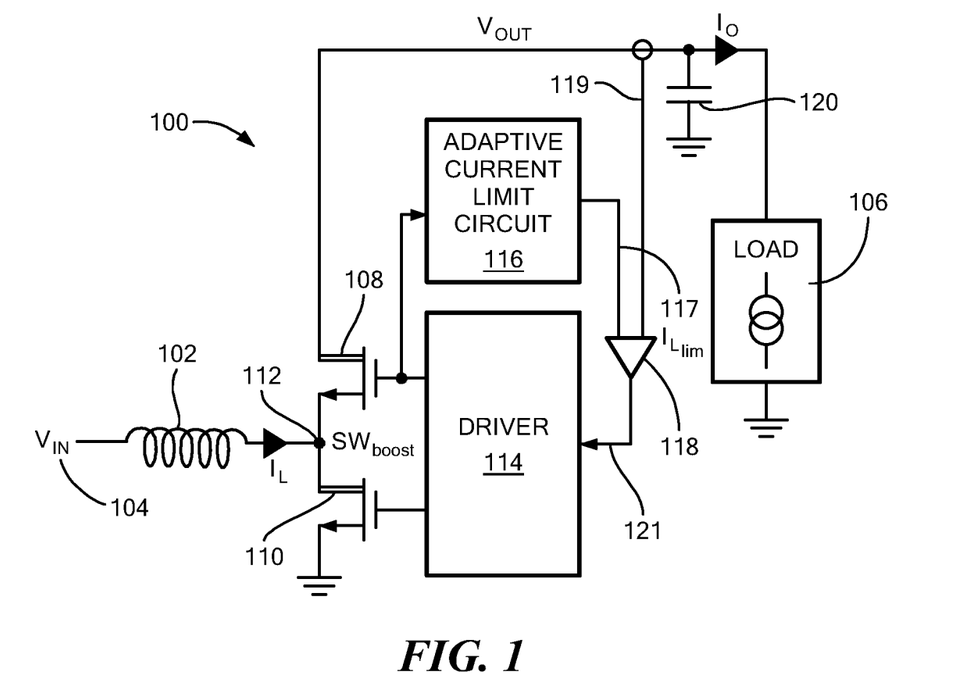
FIG. 1 is a simplified block diagram of a power converter than includes an adaptive current limit circuit.

Referring to FIG. 1, a power converter 100 includes an inductor 102 coupled to an input voltage source 104, and a load 106 to which an output current $I_O$ flows. A current $I_L$ flows through the inductor 102. In general, the power converter 100 is configured to maintain the output current $I_O$ at or below a desired, fixed output current limit level $I_{Olim}$. Suffice it to say here that the output current limit level $I_{Olim}$ may be a predetermined value that is chosen based on the particular application. For example, the output current limit level $I_{Olim}$ may be chosen to prevent the power converter 100 from producing an output current $I_O$ that could damage the load 106 and/or connected circuitry.

The power converter 100 includes a high side switch 108, a low side switch 110 coupled to the high side switch 108 at a switch node 112, and the inductor 102 coupled between the input voltage source 104 and the switch node 112. In some implementations, one or both of the high side switch 108 and the low side switch 110 is a Field Effect Transistor (FET). The power converter 100 includes a driver 114 coupled to the high side switch 108 and the low side switch 110 and configured to generate a high side control signal for controlling the high side switch 108 at a duty cycle (1-D) and a low side control signal for controlling the low side switch 110 at a duty cycle (D) complementary with respect to the duty cycle (1-D) of the high side switch 108, where D is less than one. By adjusting the duty cycles of the high side switch 108 and the low side switch 110, the current $I_L$ through the inductor 102 can be controlled.

In general, power converter 100 can be an indirect energy transfer power converter in the sense that the main energy storage component (e.g., the inductor 102) is not continuously directly coupled to the output, and thus, the output current $I_O$ is not the same as the inductor current $I_L$. Ideally, the output current $I_O$ is limited to a constant output current limit level $I_{Olim}$ that does not vary over operating conditions and in a way that protects the load 106 from possible overload and does not cause unnecessary power dissipation. Meeting these goals can be challenging in converters in which the main energy storage component (e.g., the inductor) is not continuously directly coupled to the output (i.e., in indirect energy transfer converters) because current limiting operates by controlling the output current $I_O$ while manipulating the inductor current $I_L$.

In this example, the power converter 100 is a Boost converter, but other types of indirect energy transfer power converters can employ the circuitry and techniques described herein, such as a Buck-Boost converter. Further, while the example Boost converter 100 has a half-bridge topology, other indirect energy transfer power converters are possible, such as an H-bridge Buck-Boost converter.

According to the disclosure, by operation of an adaptive current limit circuit 116, the high side switch 108, the low side switch 110, and the driver 114 are configured to operate to cause the inductor current $I_L$ to be limited to an adaptive current limit threshold $I_{Llim}$ 117 that results in the output current $I_O$ being maintained at or below the fixed output current limit level $I_{Olim}$ irrespective of changes to the duty cycle (1-D) of the high side switch 108 and the duty cycle (D) of the low side switch 110.

The adaptive current limit circuit 116 is coupled to receive the high side control signal from the driver 114 and configured to generate the adaptive current limit threshold $I_{Llim}$ 117. The adaptive current limit threshold $I_{Llim}$ 117 varies based at least in part on the duty cycle (1-D) of the high side switch 108.

The power converter 100 includes a comparator 118 that is coupled to receive the adaptive current limit threshold $I_{Llim}$ 117 and a signal 119 indicative of the current through the inductor 102. The comparator 118 is configured to compare the adaptive current limit threshold $I_{Llim}$ 117 to the signal 119 indicative of the current through the inductor 102 and generate a current limit signal 121.

The power converter 100 can be configured to operate in various control modes, including but not limited to peak current mode control, valley current mode control, average current mode control, etc. In peak current mode control, the adaptive current limit circuit 116 is configured to clamp the peak of the inductor current $I_L$ to the adaptive current limit threshold $I_{Llim}$ 117. In valley current mode control, the adaptive current limit circuit 116 is configured to clamp the valley of the inductor current $I_L$ to the adaptive current limit threshold $I_{Llim}$ 117. In average current mode control, the adaptive current limit circuit 116 is configured to clamp the average of the inductor current $I_L$ to the adaptive current limit threshold $I_{Llim}$ 117. In an example embodiment, the converter 100 is operated based on average current mode control.

In some implementations, the signal 119 indicative of the current through the inductor 102 may be provided by current sense circuitry that converts the sensed inductor current $I_L$ to a voltage. For example, the inductor current $I_L$ can be sensed by measuring the voltage across a series resistor. The signal 119 indicative of the current through the inductor 102 can be provided to the comparator 118. The adaptive current limit threshold $I_{Llim}$ 117 can be a voltage signal for coupling to the comparator 118 for comparison.

Figure 2:
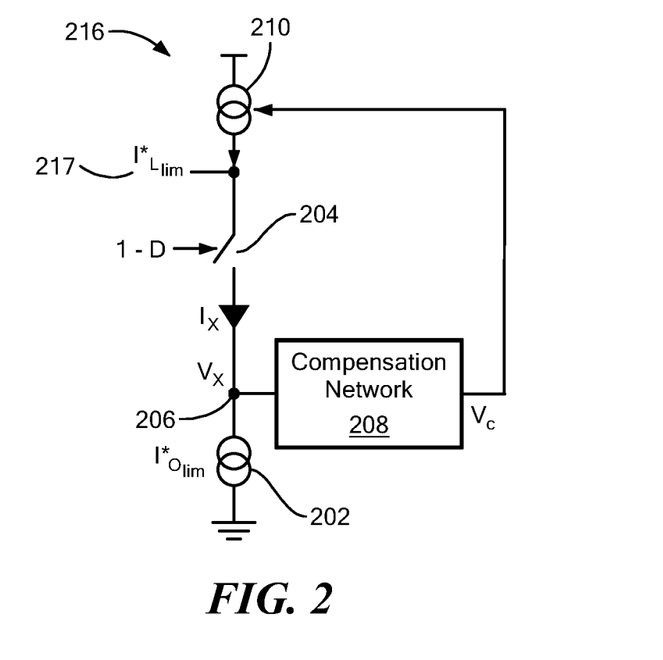
FIG. 2 is a block diagram of an example adaptive current limit circuit.

As will become apparent from consideration of FIG. 2, the adaptive current limit threshold $I_{Llim}$, 117 is indicative of an average inductor current suitable to limit the output current $I_O$ to the desired fixed output current limit level $Io_{lim}$. It will be appreciated by those of ordinary skill in the art that the adaptive current limit circuit 116 will still operate to limit the output current $I_O$ to the desired fixed output current limit level $I_{Olim}$ even though different characteristics of currents are compared by the comparator 118 (e.g., where the signal 119 indicative of the current through the inductor 102 is indicative of the peak current through the inductor 102 but the adaptive current limit threshold $I_{Llim}$ 117 is indicative of a desired maximum average inductor current). However, in some embodiments, the signal 119 and the adaptive current limit threshold 117 can be indicative of the same aspect of the respective currents. For example, the signal 119 can be converted to indicate an average current through the inductor 102 rather than a peak current through the inductor 102.

The current limit signal 121 can be received by the driver 114 to cause the driver 114 to adjust the duty cycle (1-D) of the high side switch 108 and the duty cycle (D) of the low side switch 110 accordingly. For example, if the current limit signal 121 indicates that the current $I_L$ through the inductor 102 (as indicated by the signal 119 indicative of the current through the inductor 102) has reached or surpassed the adaptive current limit threshold $I_{Llim}$, 117, the duty cycles can be adjusted to cause the current $I_L$ through the inductor 102 to generally decrease. If the current limit signal 121 continues to indicate an overcurrent condition for more than a predetermined time interval, other action can be taken to limit the output current, such as shutting down the power converter 100.

The power converter 100 can include a capacitor 120 that is configured to store a charge to assist in smoothing the output current $I_O$.

FIG. 2 shows an example adaptive current limit circuit 216 according to the disclosure. The adaptive current limit circuit 216 may be an example of the adaptive current limit circuit 116 of FIG. 1. The adaptive current limit circuit 216 is configured to generate an adaptive current limit threshold $I^*_{Llim}$, 217 that can be the same as the adaptive current limit threshold $I_{Llim}$ 117 described with respect to FIG. 1 or, alternatively, can be a modified version of the adaptive current limit threshold $I_{Llim}$. 117. For example, the modified adaptive current limit threshold $I^*_{Llim}$, 217 may have a value that is proportional to the adaptive current limit threshold $I_{Llim}$, 117, but scaled down. Scaling (e.g., scaling down) the threshold can reduce unnecessary power consumption by the power converter 100 and can be implemented in various ways, such as with a current mirror arrangement.

The adaptive current limit threshold $I^*_{Llim}$ 217 is configured to adapt as one or more operating conditions of the power converter 100 change in order to achieve a fixed, or constant output current limit level $I_{Olim}$. An output current limit level $I^*_{Olim}$ can be a modified or scaled down version of the output current limit level $I_{Olim}$ to which the output current Io is limited. By way of a non-limiting example, if the desired output current limit level $I_{Olim}$ is 1 amp, the output current limit level $I^*_{Olim}$ can be 10 microamps, for example. Here again, providing a scaled output current limit level $I^*_{Olim}$ within the circuit 216 can reduce unnecessary power consumption.

The adaptive current limit circuit 216 includes a load, or output current limit reference generator 202 that is configured to generate the output current limit level, or reference current $I^*_{Olim}$ at a level indicative of the output current limit level $I_{Olim}$ to which it is desired to limit the converter output current $I_O$. In some implementations, the output current limit level $I^*_{Olim}$ can be a predetermined, preset value to meet application current limitation requirements (or a scaled down version thereof) for maximum permissible output current. In some implementations, output current limit level $I^*_{Olim}$ may be a programmable and/or configurable parameter of the power converter 100.

The adaptive current limit circuit 216 includes a switch 204 operable to turn on and off at the duty cycle (1-D) of the high side switch 108 of FIG. 1. The switch 204 is coupled to the load current limit reference generator 202 at a feedback node 206. Switch 204 can take the form of any suitable integrated switch element, such as a transistor.

Figure 3:
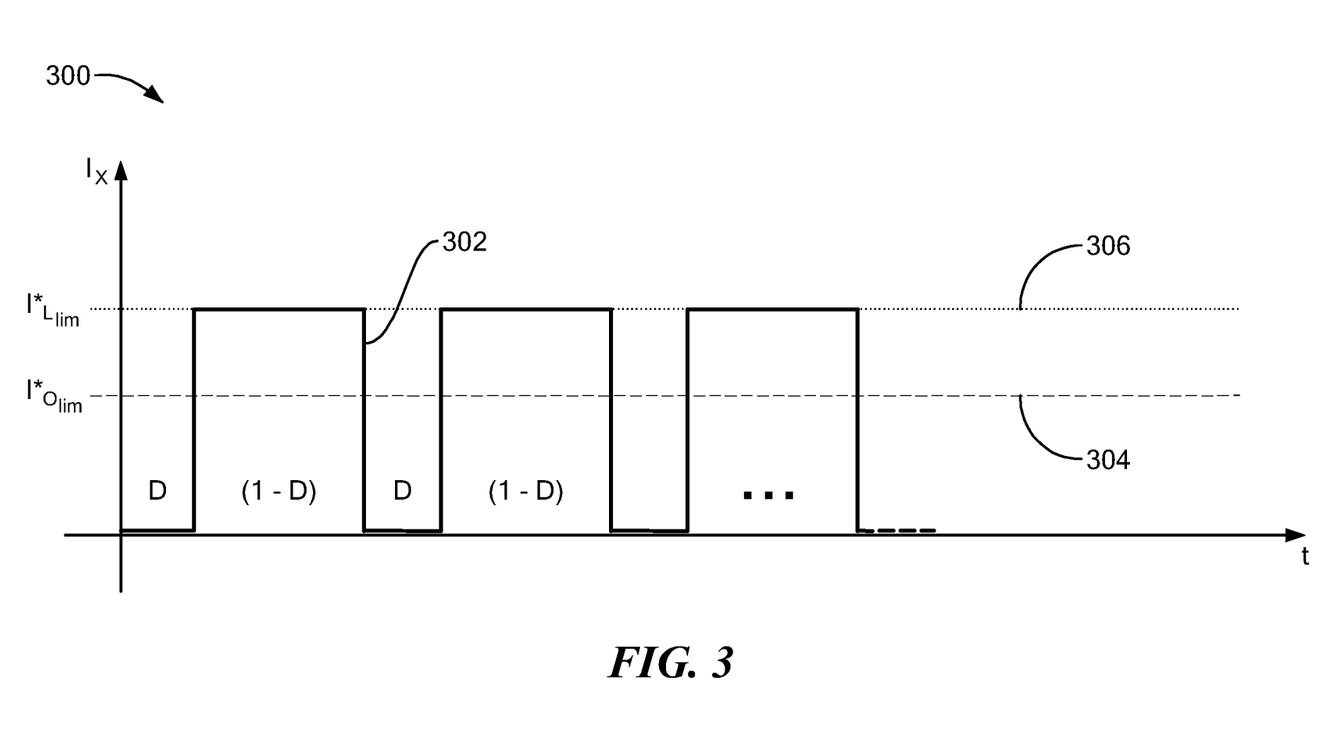
FIG. 3 is a chart illustrating various exemplary currents of the adaptive current limit circuit of FIG. 2.

Operation of switch 204 at the duty cycle (1-D) yields a square-wave current $I_x$ (e.g., as labelled 302 in FIG. 3). The current $I_x$ has a value that varies between the adaptive current limit threshold $I^*_{Llim}$ 217 (e.g., as labelled 306 in FIG. 3) and zero based on the duty cycle (1-D).

The adaptive current limit circuit 216 includes a compensation network 208 having an input coupled to the feedback node 206 and an output at which a control, or compensation voltage $V_C$ is provided to a current source 210. The current source 210 is configured to generate the current $I_x$ based on the received control voltage $V_C$.

In some implementations, the compensation network 208 can include one or more integrators and/or have one or more orders of integration. Example compensation networks are shown and described below in connection with FIGS. 5 and 6. In general, the compensation network 208 is configured to provide a transfer function to keep a negative feedback loop of the adaptive current limit circuit 216 stable.

For each switching cycle of the power converter 100, the relationship between the desired output current limit level I*$_{Olim}$ and the adaptive current limit threshold I*$_{Llim}$ 117 can be expressed as follows:

$$I*_{L_{lim}} = \frac{I*_{O_{lim}}}{1-D} \quad (1)$$

where 1-D is the duty cycle of the high side switch 108.

By operation of the closed loop circuit 216, the average of the current I$_x$ through the switch 204 is equal to the reference current I*$_{Olim}$ generated by the load current limit reference generator 202.

The adaptive current limit circuit 216 is configured to generate the adaptive current limit threshold I*$_{Llim}$ 217. As described above, the current I$_x$ through the switch 204 is a square wave with a high value of I*$_{Llim}$ 217. The adaptive current limit circuit 216 can be considered to extract information related to the current I$_x$ (e.g., such as the value of the high current of the square wave I$_x$) and generate the adaptive current limit threshold I*$_{Llim}$ 217 based on the extracted information.

In some implementations, the adaptive current limit circuit 216 may include a current mirror for generating the adaptive current limit threshold I*$_{Llim}$ 217, or circuitry for generating a voltage that corresponds to the adaptive current limit threshold I*$_{Llim}$ 217, or other circuitry for providing a representation of the adaptive current limit threshold I*$_{Llim}$ 217 for comparison (e.g., by comparator 118 of FIG. 1).

FIG. 3 is a chart 300 illustrating exemplary currents of the adaptive current limit circuit 216 of FIG. 2. The chart 300 includes representations of the current I$_x$ 302, the reference current I*$_{Olim}$ 304, and the adaptive current limit threshold I*$_{Llim}$ 306 over time. The current I$_x$ 302 is a square wave with a value that alternates between the adaptive current limit threshold I*$_{Llim}$ 306 and zero according to the duty cycle (1-D). According to Equation (1) above, the reference current I*$_{Olim}$ is equal to I*$_{Llim}$*(1-D). In other words, the average of the current I$_x$ 302 across a cycle is equal to the reference current I*$_{Olim}$ 304. Thus, in order to maintain a consistent output current limit level I$_{Olim}$ the adaptive current limit threshold I*$_{Llim}$ 306 increases as the duty cycle (1-D) of the switch 204 decreases.

Figure 4A:
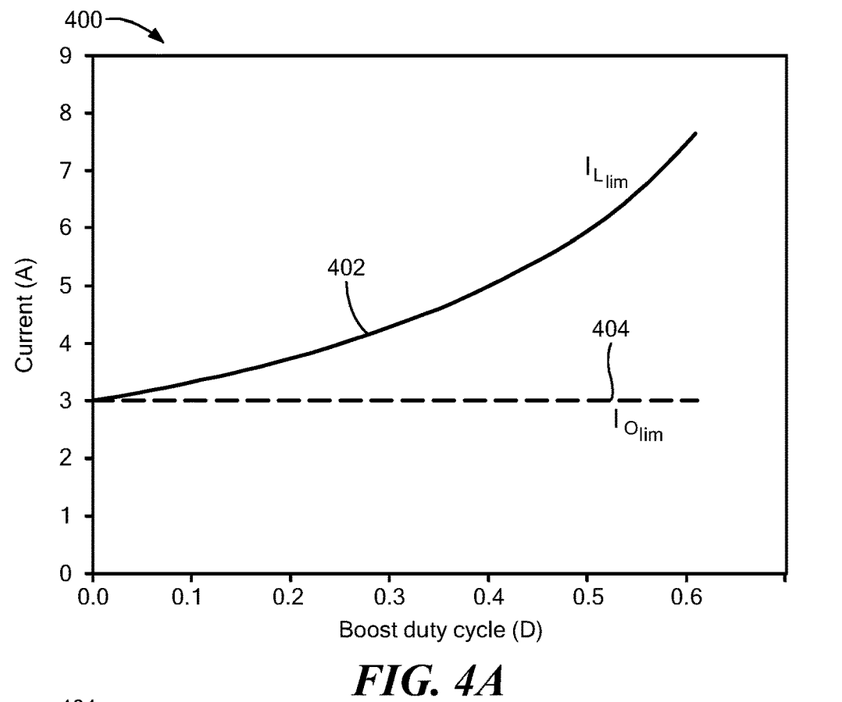
FIG. 4A is a chart illustrating an adaptive current limit threshold $I_{Llim}$ and an output current limit level $I_{Olim}$ with respect to a duty cycle of a high side switch.

FIG. 4A is a chart 400 illustrating representations of the adaptive current limit threshold I$_{Llim}$, 402 and the output current limit level I$_{Olim}$ 404 with respect to the Boost duty cycle (D) of the power converter 100, which is the duty cycle (D) of the low side switch 110. As the Boost duty cycle (D) of the power converter 100 increases, the adaptive current limit threshold I$_{Llim}$, 402 required to maintain a fixed output current limit level I$_{Olim}$ 404 increases. This scenario can correspond to converter operation in which the input voltage is decreasing over time and the Boost duty cycle (D) of the power converter 100 is increasing over time to maintain the constant output current limit level I$_{Olim}$ 404, for example as shown in FIG. 4C.

Figure 4B:
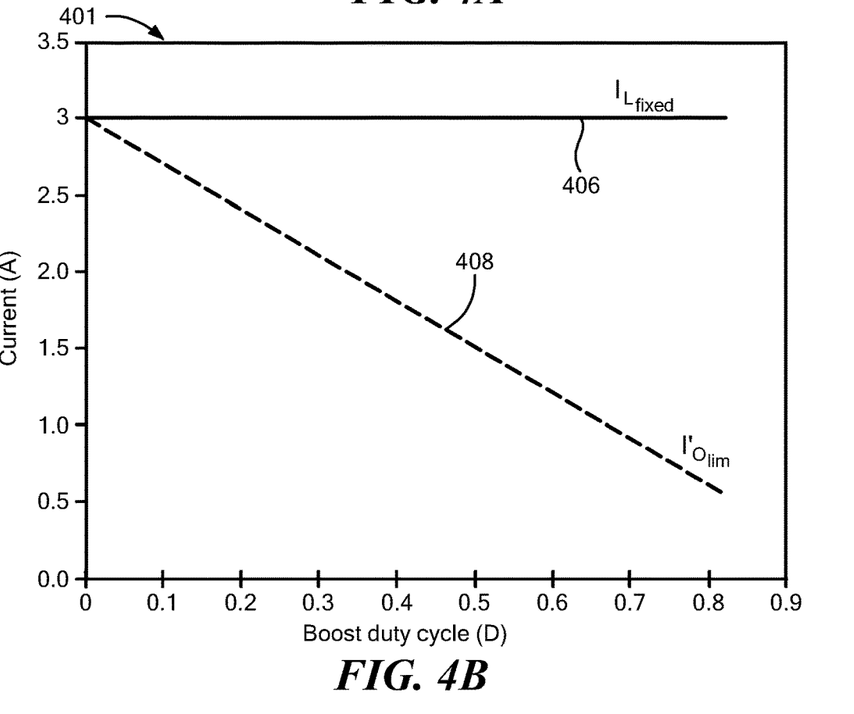
FIG. 4B is a chart illustrating a hypothetical fixed current limit threshold $I_{Lfixed}$ and an output current limit level $I'_{Olim}$ with respect to a duty cycle of a high side switch.

In contrast, FIG. 4B is a chart 401 illustrating the impact that a hypothetical fixed current limit threshold I$_{Lfixed}$ 406 would have on an output current limit level I'$_{Olim}$ 408 of a hypothetical converter without the adaptive current limit circuit as the Boost duty cycle (D) of the power converter 100 increases. When the fixed current limit threshold I$_{Lfixed}$ 406 is applied, the output current limit level I'$_{Olim}$ 408 decreases as the Boost duty cycle (D) of the power converter 100 increases. This behavior can be undesirable because such a fixed current limit threshold I$_{Lfixed}$ 406 that is high enough to ensure that the output current I$_O$ does not exceed a specified level would be unnecessarily high under certain operating conditions and thus, result in undesirable power dissipation. Further, it is typically desirable to impose a current limit level on the output current I$_O$ that is fixed irrespective of operating conditions of the converter (e.g., irrespective of the duty cycles of the switches of the converter), further exemplifying why the behavior of FIG. 4B can be undesirable.

Figure 4C:
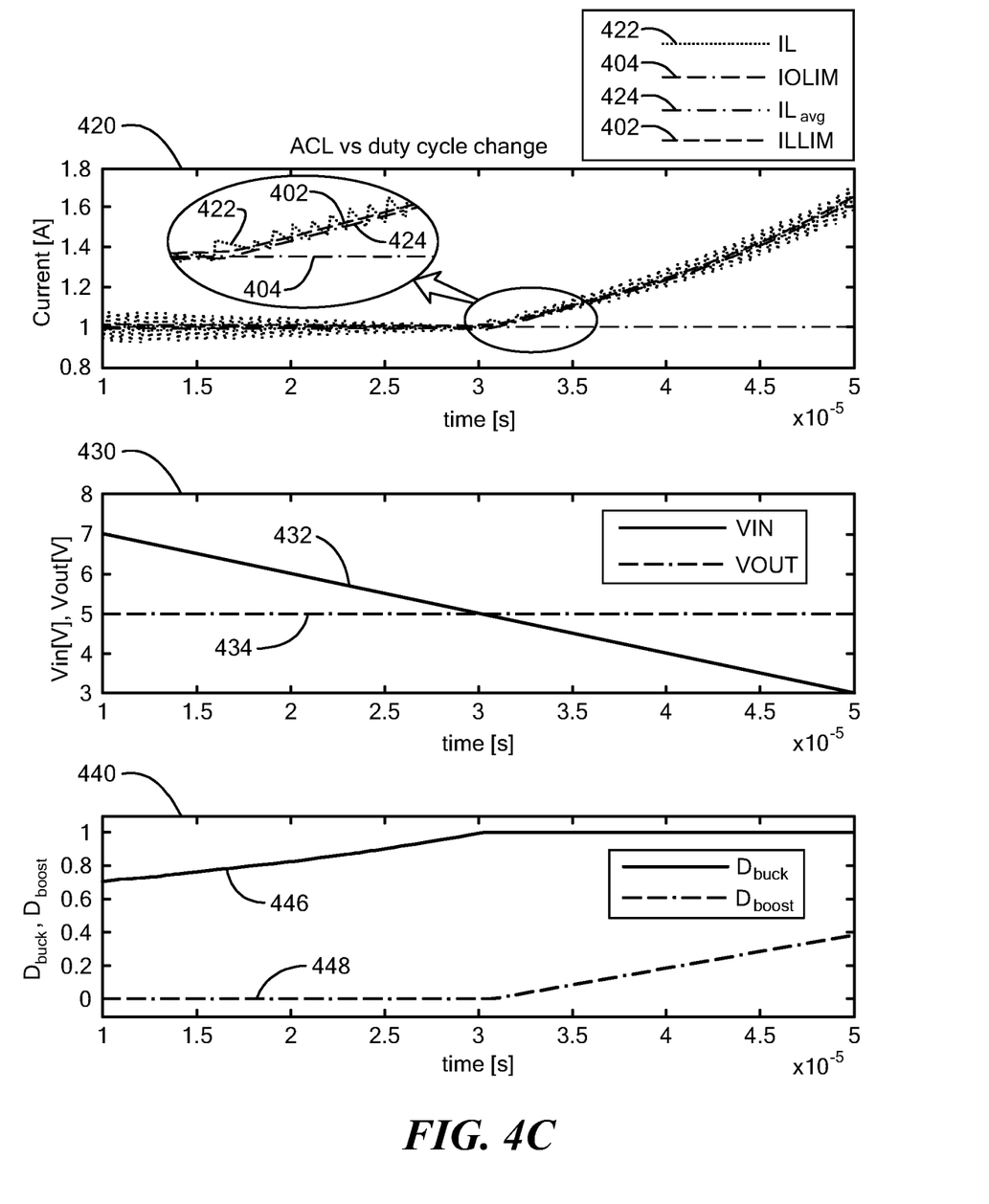
FIG. 4C is a chart illustrating aspects of the adaptive current limit circuit operation under converter operating conditions including a decreasing input voltage.

FIG. 4C shows charts illustrating aspects of the adaptive current limit circuit operation under converter operating conditions including a decreasing input voltage. Chart 420 shows the adaptive current limit threshold I$_{Llim}$ 402, the output current limit level I$_{Olim}$ 404, the inductor current I$_L$ 422, and the average inductor current I$_{Lavg}$ 424 over time. Chart 430 illustrates the converter operating condition of a decreasing input voltage 432 and operation of the converter to maintain the output voltage 434 at a constant value over the same time. Chart 440 shows duty cycles associated with an example Buck-Boost converter, including a buck duty cycle 446 and a boost duty cycle 448 over the same time. As is apparent, as the boost duty cycle 448 increases (in order to thereby increase the inductor current I$_L$ 422 and maintain the output voltage 434 at a constant value), the adaptive current limit threshold I$_{Llim}$ 402 increases by operation of the closed loop circuit 216 (FIG. 2).

Figure 4D:
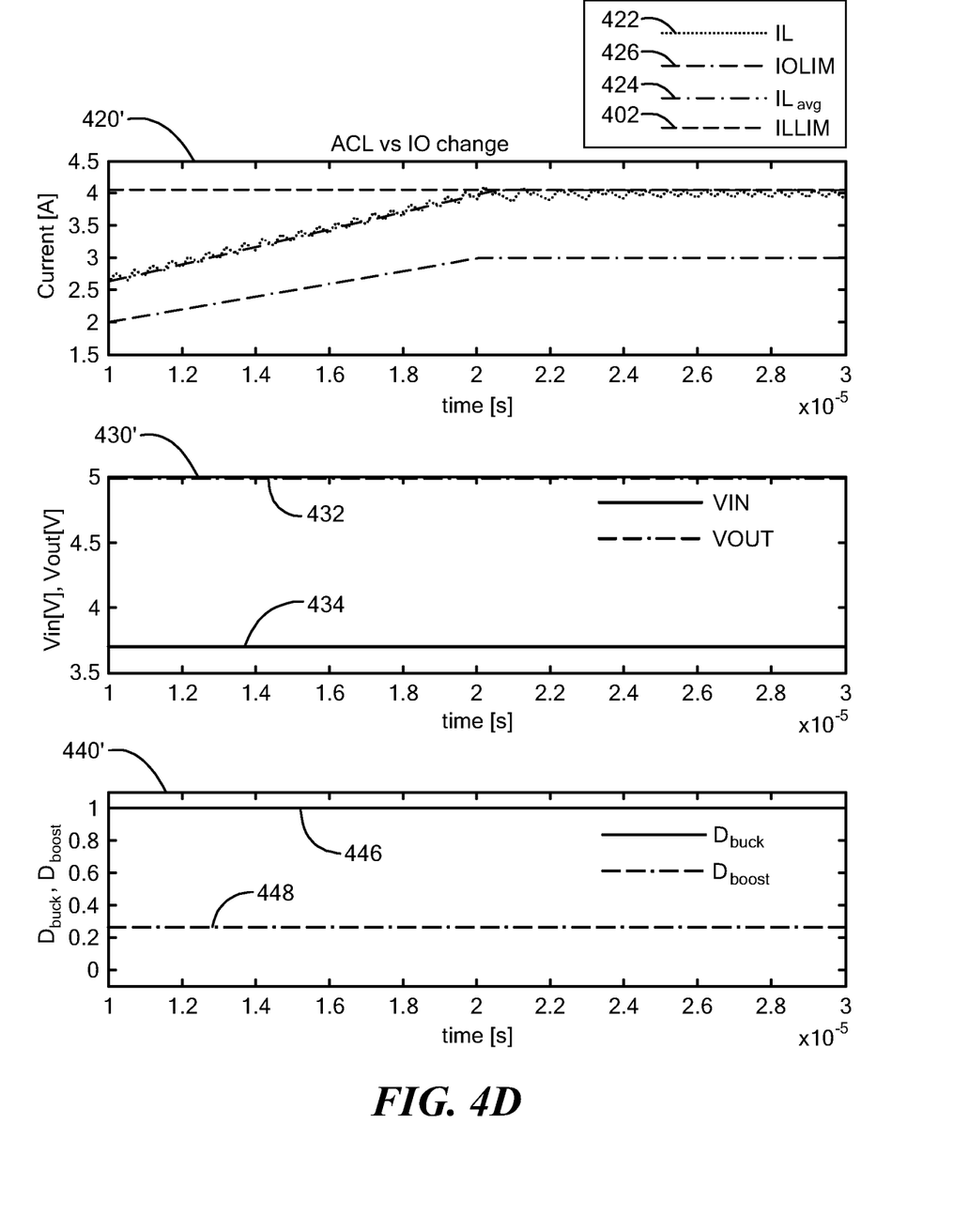
FIG. 4D is a chart illustrating aspects of the adaptive current limit circuit operation under converter operating conditions including constant converter duty cycles.

FIG. 4D shows charts illustrating aspects of the adaptive current limit circuit operation under converter operating conditions including constant converter duty cycles. Chart 420' shows the adaptive current limit threshold I$_{Llim}$ 402, the output current I$_O$ 426, the inductor current I$_L$ 422, and the average inductor current I$_{Lavg}$ 424 over time. Chart 430' illustrates the converter operating condition of a constant input voltage 434 and a constant output voltage 432 over the same time. Chart 440' shows duty cycles associated with an example Buck-Boost converter, including a buck duty cycle 446 and a boost duty cycle 448 over the same time. As is apparent, since the boost duty cycle 448 is constant, so too is the adaptive current limit threshold I$_{Llim}$ 402. As the output current I$_O$ 426 increases, the inductor current I$_L$ 422 hits the adaptive current limit threshold Turn 402 set on the inductor current I$_L$ 422 by the adaptive current limit circuit.

Figure 5:
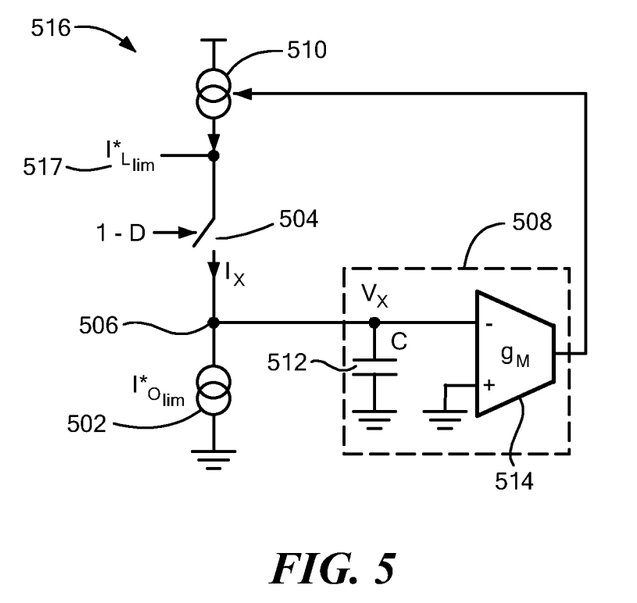
FIG. 5 is a block diagram of an example adaptive current limit circuit including a compensation network with one order of integration.

FIG. 5 is a block diagram of an example adaptive current limit circuit 516 that can be the same as or similar to circuit 116, 216 and is configured to generate an adaptive current limit threshold I*$_{Llim}$ 517 that can be the same as or similar to threshold 117, 217 (FIGS. 1 and 2). Thus, the adaptive current limit circuit 516 can operate in a manner substantially similar to that described above. To this end, the adaptive current limit circuit 516 can include a load current limit reference generator 502 (that can be the same as or similar to reference generator 202 of FIG. 2) configured to generate the reference current I*$_{Olim}$ at a level indicative of the output current limit level I$_{Olim}$ to which it is desired to limit the converter output current I$_O$. As noted above, the reference current level I*$_{Olim}$ may be the same as or may be a scaled down version of the output current limit level I$_{Olim}$ to which it is desired to limit the converter output current I$_O$.

The load current limit reference generator 502 is coupled to a switch 504 (that can be the same as or similar to switch 204 of FIG. 2) at a feedback node 506.

A compensation network 508 is coupled between the feedback node 506 and a current source 510 (that can be the same as or similar to current source 210 of FIG. 2). Provided that the negative feedback loop is stable, the average current $I_x$ through the switch 504 is equal to the reference current $I^*_{Llim}$ generated by the load current limit reference generator 502. By operation of the closed loop circuit 516, the adaptive current limit threshold $I^*_{Llim}$ 517 is generated for comparison to a signal indicative of the inductor current (e.g., signal 119 of FIG. 1) in order to thereby prevent the output current $I_O$ from exceeding the desired output current limit level $I_{Olim}$.

The compensation network 508 is configured to provide a stable negative feedback loop. The compensation network 508 can include an integrator and can be referred to as having one order of integration, as being a type I compensator, or as being a single stage compensation network 508. The compensation network 508 can be configured to achieve high gain at low frequencies.

The compensation network 508 includes a capacitor 512 and a transconductance amplifier 514. The capacitor 512 is coupled to switch 504 at the feedback node 506 and is configured to smooth a voltage (e.g., a feedback voltage $V_X$). The transconductance amplifier 514 together with the current source 510 are configured to convert the feedback voltage $V_X$ into a current (i.e., the current $I_x$ through the switch 504). The current $I_x$ through the switch 504 can have a value equal to the feedback voltage $V_X$ multiplied by the gain $g_M$ of the transconductance amplifier 514.

Figure 5A:
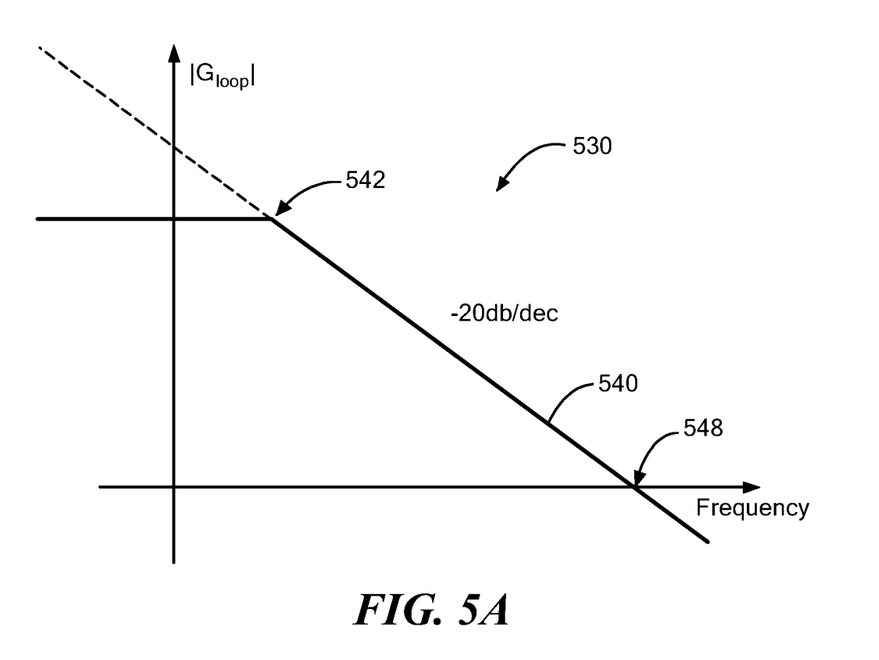
FIG. 5A is a Bode plot that corresponds to the adaptive current limit circuit of FIG. 5.

FIG. 5A is a Bode plot 530 that corresponds to the adaptive current limit circuit 516 of FIG. 5. The transfer function of the circuit 516 can be expressed as:

$$G_{loop} = -\frac{g_M}{sC}(1-D) \quad (2)$$

where $G_{loop}$ is the loop gain, g m is the gain of the transconductance amplifier 514, C is the capacitance of capacitor 512, and (1-D) is the duty cycle of the high side switch (e.g., switch 108 in FIG. 1) and the switch 504. A pole 542 occurs at a frequency established by the capacitance C of capacitor 512. A frequency response 540 decreases at 20 db/decade and the zero crossing 548 of the frequency response 540 (i.e., the unity gain frequency, or bandwidth BW) of the loop is given by:

$$BW = \frac{g_M}{2\pi C}(1-D) \quad (3)$$

Figure 5B:
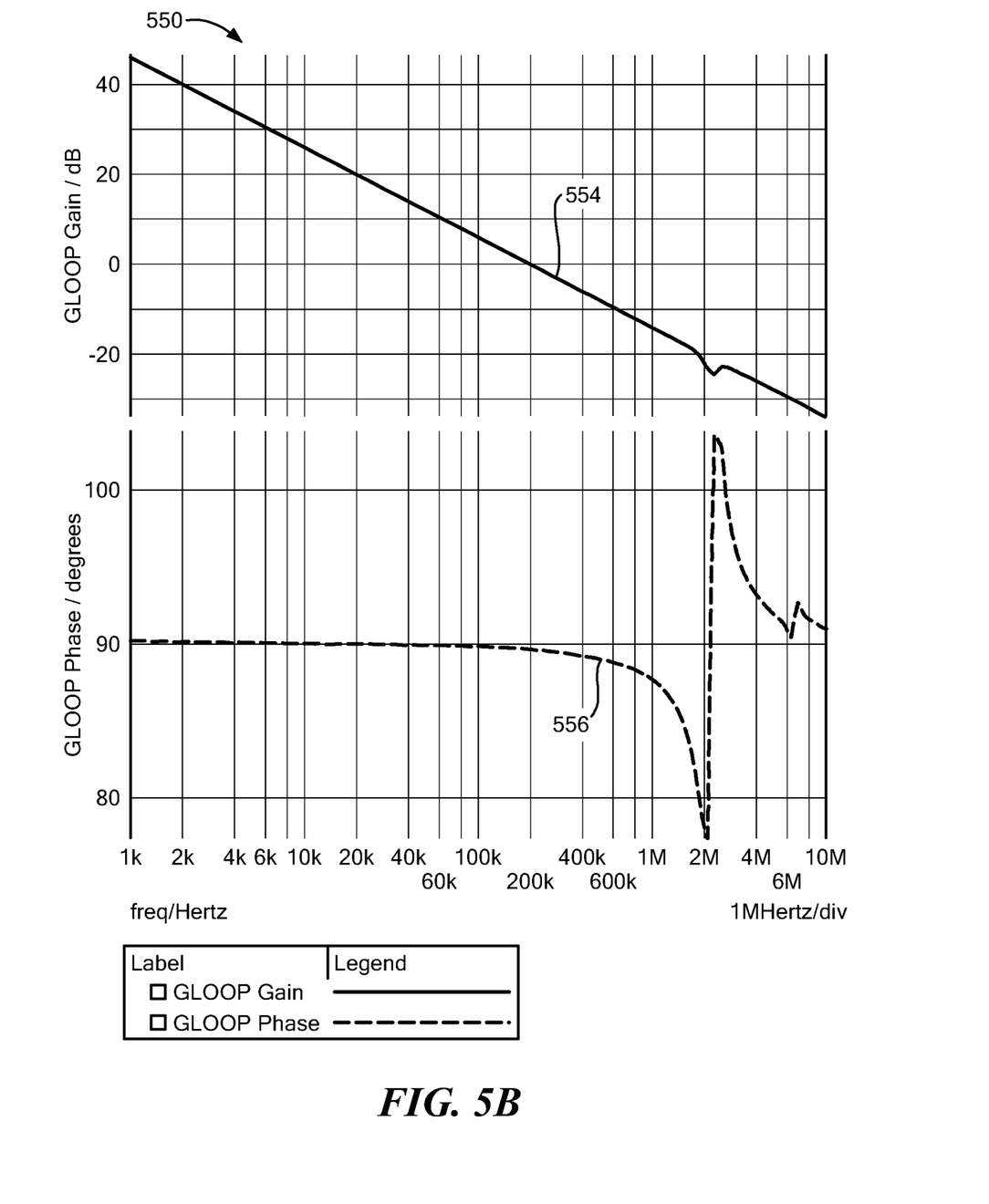
FIG. 5B is a chart illustrating results of a simulation of the adaptive current limit circuit of FIG. 5.

FIG. 5B is a chart 550 illustrating simulation results associated with the adaptive current limit circuit 516 of FIG. 5 including small signal behavior of the compensation network 508 with the loop gain labelled 554 and the phase labelled 556. The simulation is based on the following example parameter values: the gain $g_M$ of the transconductance amplifier 514 is 50 µA/V, the capacitance C of capacitor 512 is 20 pF, the output current limit level $I_{Olim}$ is 5 µA, the converter switching frequency is 2.2 MHz, the duty cycle is 0.5, the bandwidth BW is approximately 198 kHz, the resulting $I_{Llim}$ is 10 µA, and the resulting ripple on the output current $I_O$ is approximately 2.8 µA.

Figure 5C:
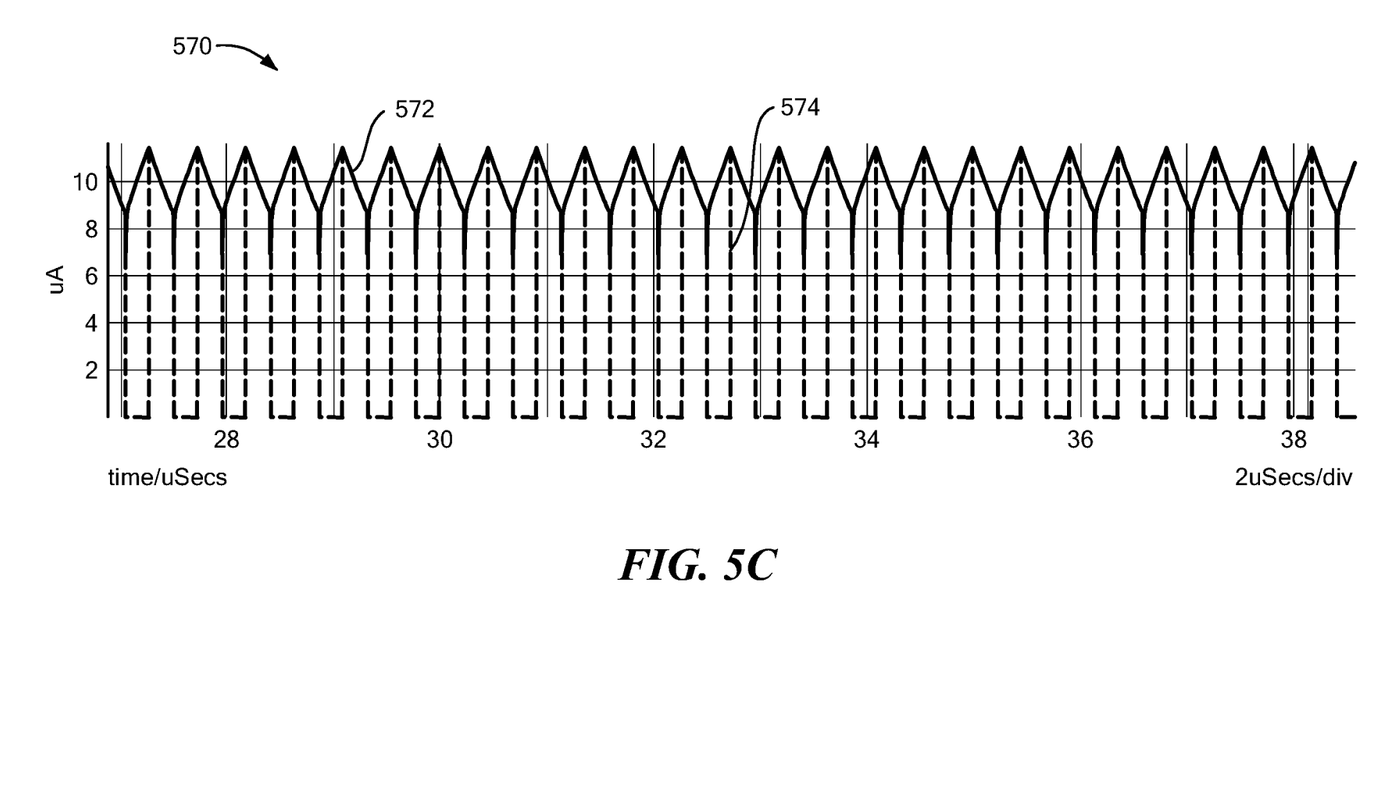
FIG. 5C is a chart illustrating results of a simulation of the adaptive current limit circuit of FIG. 5.

Referring also to FIG. 5C, a chart 570 illustrates simulation results associated with the adaptive current limit circuit 516 of FIG. 5 employing the above parameters. In particular, the current $I_x$ 574 through the switch 504 is shown by a dotted line and the adaptive current limit threshold $I^*_{Llim}$ 572 is shown by a solid line. The behavior of the current $I_x$ 574 and the adaptive current limit threshold $I^*_{Llim}$ 572 results in a ripple on the output current $I_O$ of the converter (e.g., converter 100 of FIG. 1), which is undesirable because it can adversely affect the stability of the final limitation current.

The ripple versus the current limit level ratio can be expressed as follows:

$$\frac{\text{ripple}}{I_{lim}} = \frac{I_O}{C} \cdot DT_{sw} \cdot g_M \frac{1-D}{I_O} = DT_{SW} \cdot BW(\omega) \quad (4)$$

In the example embodiment, the ratio is equal to 2.8 µA/10 µA or 28.5%. Equation (4) reveals that the bandwidth BW and resulting ripple are strongly linked and there is little that can be adjusted in order to achieve low ripple with the desired bandwidth.

Figure 6:
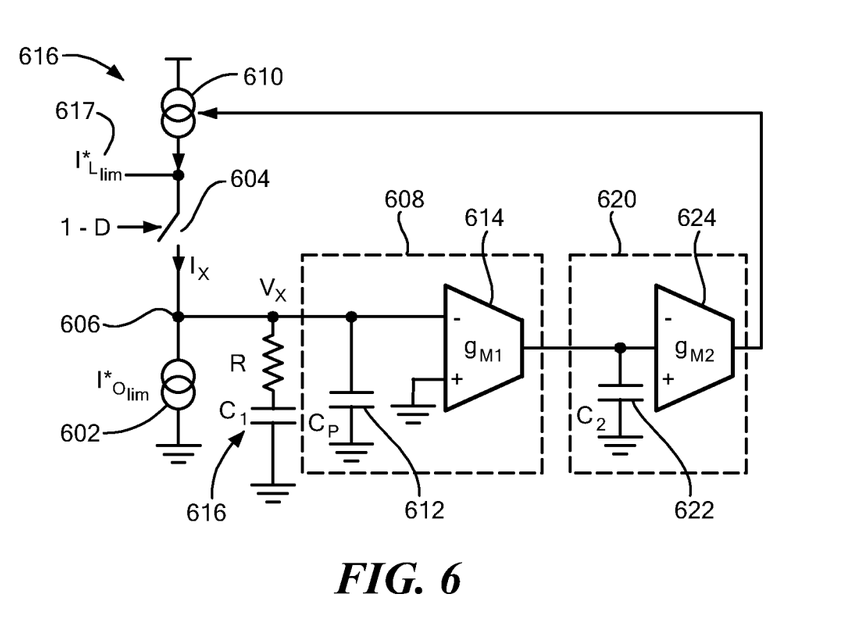
FIG. 6 is a block diagram of an example adaptive current limit circuit including a compensation network with two orders of integration.

Referring also to FIG. 6, an alternative adaptive current limit circuit 616 includes a two-stage compensation network including a filter 616 and two integration stages 608, 620. Such a compensation network with two orders of integration can be referred to as a type II compensator. In other respects, the adaptive current limit circuit 616 can be the same as or similar to circuits 116, 216, 516 (FIGS. 1, 2, 5) discussed above. Suffice it to say here that the addition of the second integration stage in the compensation network adds a pole and a zero to the negative feedback loop, thereby minimizing the ripple in the output current $I_O$ and preserving the stability of the negative feedback loop.

Like circuits 116, 216, 516, the adaptive current limit circuit 616 can include a load current limit reference generator 602 (that can be the same as or similar to reference generator 202 of FIG. 2) configured to generate the reference current $I_{Olim}$ at a level indicative of the output current limit level $I_{Olim}$ to which it is desired to limit the converter output current $I_O$. As noted above, the reference current level $I^*_{Olim}$ may be the same as or may be a scaled down version of the output current limit level $I_{Olim}$ to which it is desired to limit the converter output current $I_O$. The load current limit reference generator 602 is coupled to a switch 604 (that can be the same as or similar to switch 204 of FIG. 2) at a feedback node 606.

The compensation network including filter 616, integration stage 608, and integration stage 620 is coupled between the feedback node 606 and a current source 610 (that can be the same as or similar to current source 210 of FIG. 2). Provided that the negative feedback loop is stable, the average current $I_x$ through the switch 604 is equal to the reference current $I_{Olim}$ generated by the load current limit reference generator 602. By operation of the closed loop circuit 616, the adaptive current limit threshold $I^*_{Llim}$ 617 is generated for comparison to a signal indicative of the inductor current (e.g., signal 119 of FIG. 1) in order to thereby prevent the output current $I_O$ from exceeding the desired output current limit level $I_{Olim}$.

The compensation network is configured to provide a stable negative feedback loop and includes a filter 616 including a resistor R and capacitor $C_1$ across which a voltage (e.g., a feedback voltage $V_X$) is provided. The first integration stage 608 includes a capacitor $C_P$ 612 and a transconductance amplifier 614. The second integration stage 620 includes a capacitor $C_2$ 622 and a transconductance amplifier 624. The transconductance amplifiers 614, 624 together with the current source 610 are configured to convert the feedback voltage $V_X$ into a current (i.e., the current $I_x$ through the switch 604). The current $I_x$ through the switch 604 can have a value equal to the feedback voltage $V_X$ multiplied by the gain $g_{M1}$ of the transconductance amplifier 614 and multiplied by the gain $g_{M2}$ of the transconductance amplifier 624.

Figure 6A:
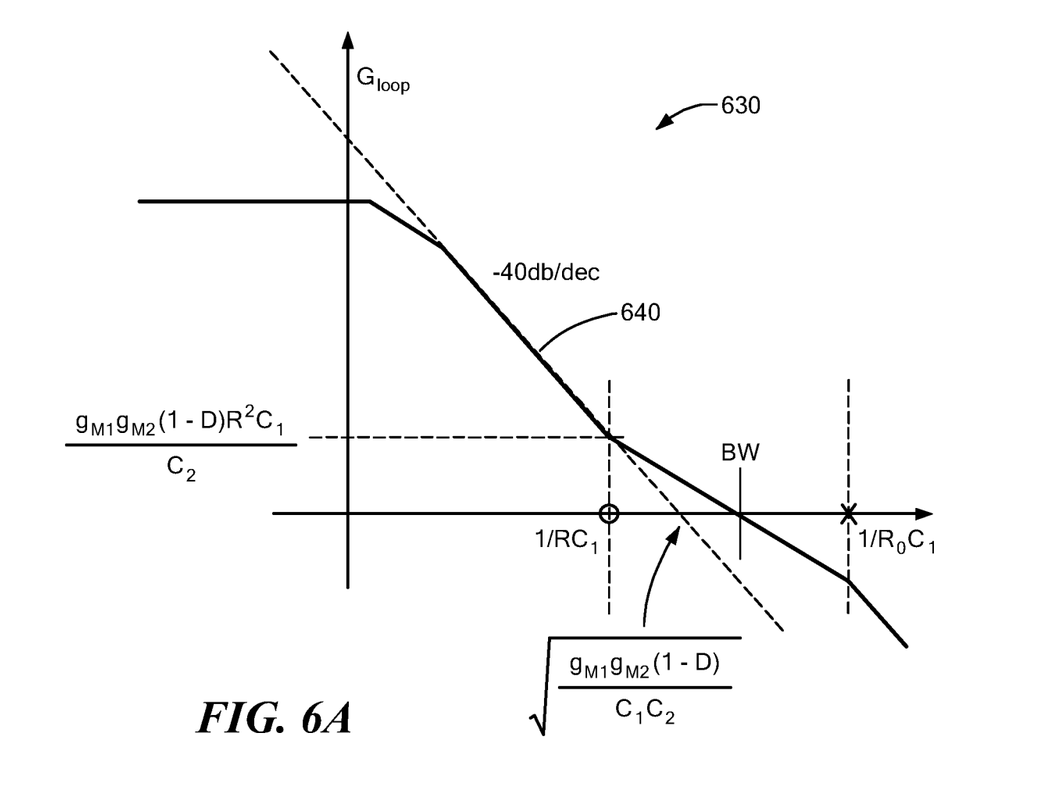
FIG. 6A is a Bode plot that corresponds to the adaptive current limit circuit of FIG. 6.

FIG. 6A is a Bode plot 630 that corresponds to the adaptive current limit circuit 616 of FIG. 6. The transfer function of the circuit 616 can be expressed as:

$$G_{loop} = -\frac{g_{M1} g_{M2}}{s^2 C_1 C_2}(1-D) \cdot \frac{1+sRC_1}{1+sR(C_P // C_1)} \quad (5)$$

where $G_{loop}$ is the loop gain, $g_{M1}$ is the gain of the transconductance amplifier 614, $g_{M2}$ is the gain of the transconductance amplifier 624, $C_1$ is the capacitance of capacitor $C_1$, $C_2$ is the capacitance of capacitor $C_2$ 622, $C_P$ is the capacitance of capacitor $C_P$ 612, and (1-D) is the duty cycle of the high side switch (e.g., switch 108 in FIG. 1) and the switch 604.

A frequency response 640 includes an additional zero and two additional poles in comparison to the single stage compensation network 508 of FIG. 5. The zero crossing of the frequency response 640 (i.e., the unity gain frequency, or bandwidth BW) of the loop is given by:

$$BW = \frac{g_{M1} g_{M2}}{2\pi C_2} R \cdot (1-D) \quad (6)$$

Figure 6B:
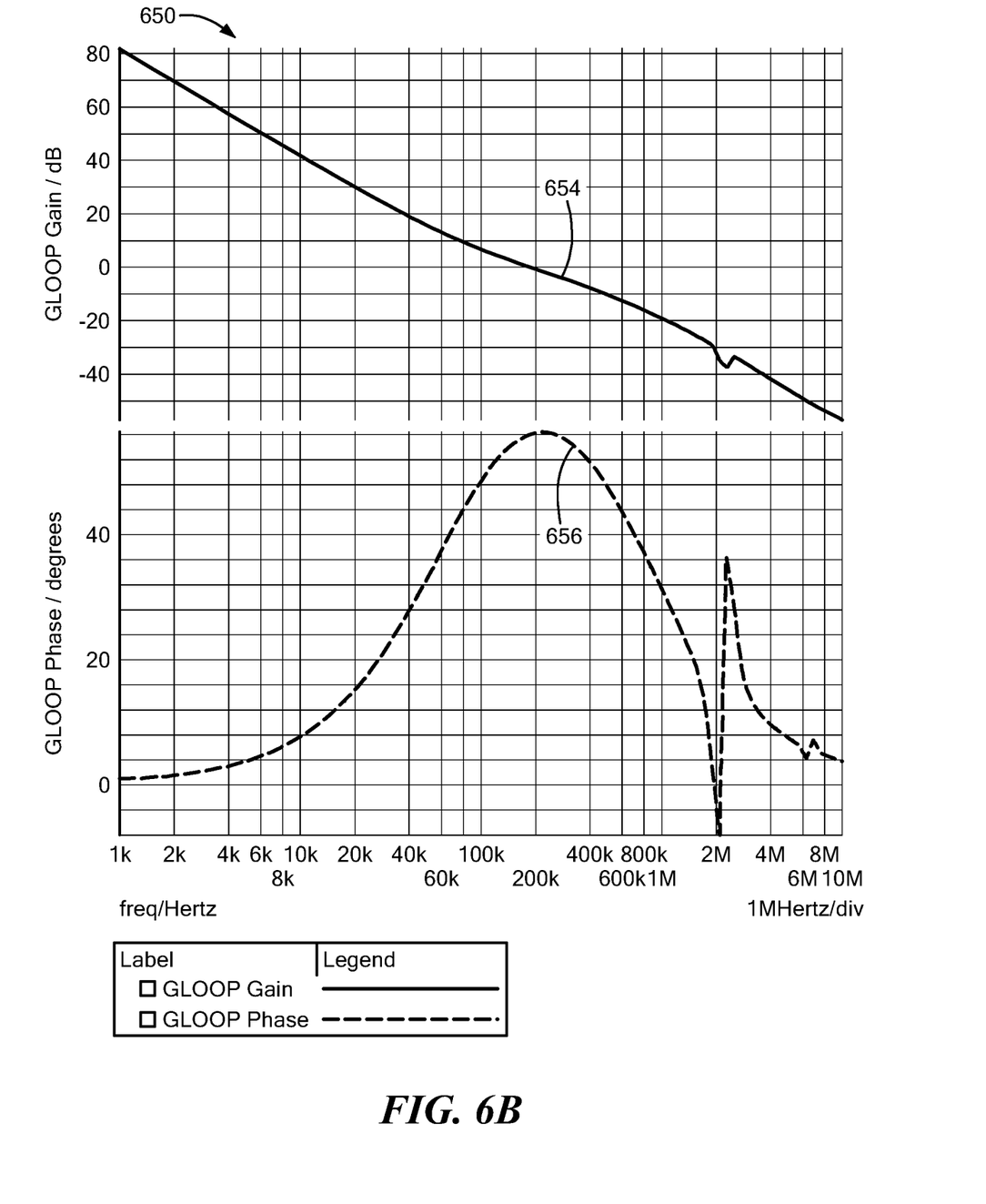
FIG. 6B is a chart illustrating results of a simulation of the adaptive current limit circuit of FIG. 6.

FIG. 6B is a chart 650 illustrating simulation results associated with the adaptive current limit circuit 616 of FIG. 6 including small signal behavior of the compensation network with the loop gain labelled 654 and the phase labelled 656. The simulation is based on the following example parameter values: the gain $g_{M1}$ of the transconductance amplifier 614 is 20 µA/V, the gain $g_{M2}$ of the transconductance amplifier 624 is 20 µA/V, the resistance of resistor R is 120 kOhms, the capacitance of capacitor $C_1$ is 20 pF, the capacitance of capacitor $C_2$ 622 is 20 pF, the capacitance of capacitor $C_P$ 612 is 2 pF, the output current limit level $I_{Olim}$ is 5 µA, the converter switching frequency is 2.2 MHz, the duty cycle is 0.5, the bandwidth BW is approximately 191 kHz, the resulting $I_{Llim}$ is 10 µA, and the resulting ripple on the output current $I_O$ is approximately 0.64 µA.

Figure 6C:
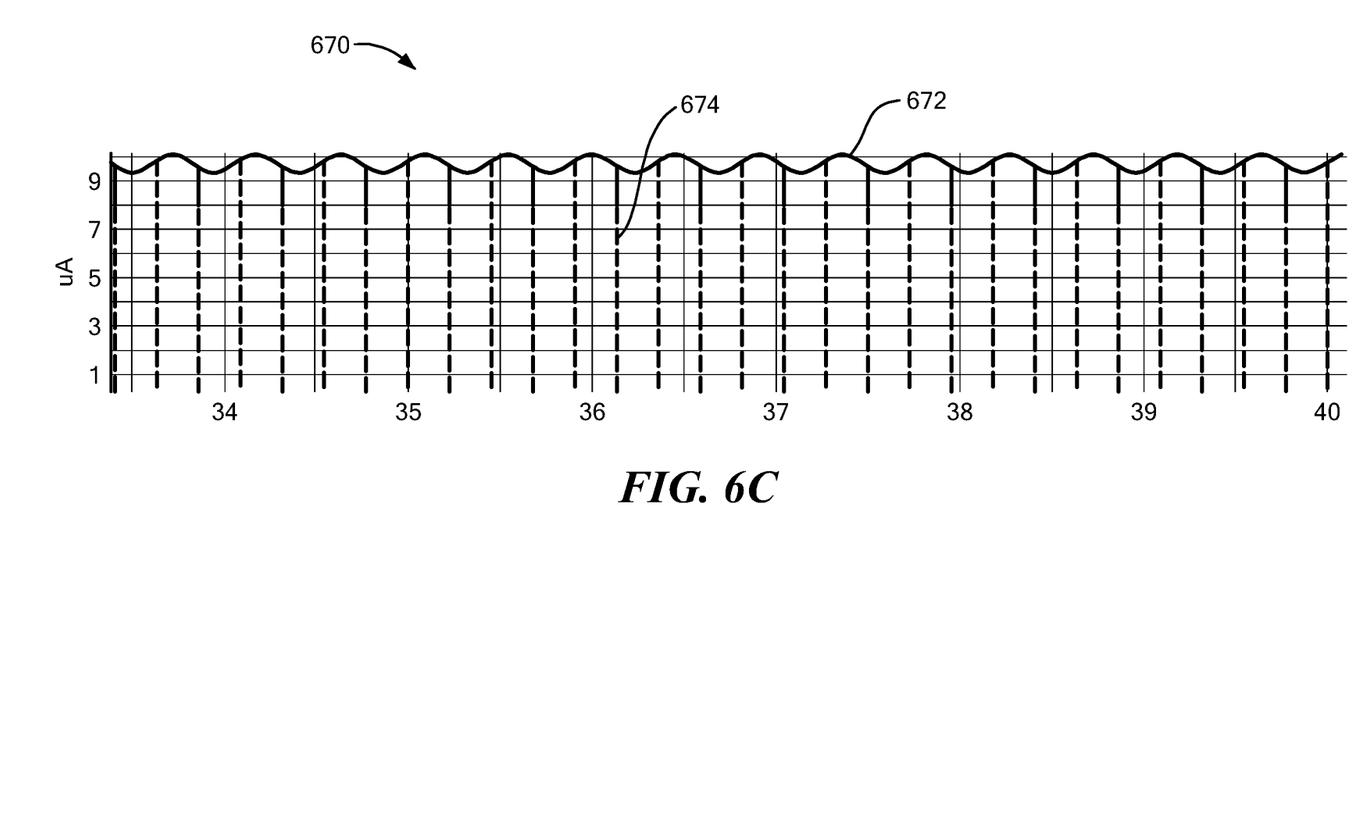
FIG. 6C is a chart illustrating results of a simulation of the adaptive current limit circuit of FIG. 6.

Referring also to FIG. 6C, a chart 670 illustrates simulation results associated with the adaptive current limit circuit 616 of FIG. 6 employing the above parameters. In particular, the current $I_x$ 674 through the switch 604 is shown by a dotted line and the adaptive current limit threshold $I*_{Llim}$ 672 is shown by a solid line. The behavior of the current $I_x$ 674 and the adaptive current limit threshold $I*_{Llim}$ 672 results in a ripple on the output current $I_O$ of the converter (e.g., converter 100 of FIG. 1), which is undesirable because it can adversely affect the stability of the final limitation current. Comparison of FIG. 6C to FIG. 5C reveals that the compensation scheme in the adaptive current limit circuit 616 of FIG. 6 yields significantly less ripple on the output current $I_O$.

The ripple versus the current limit level ratio can be expressed as follows:

$$\frac{\text{ripple}}{I_{lim}} = 2 \cdot \frac{1}{8} \frac{I_O}{C_P} \cdot (DT_{sw})^2 \cdot \frac{g_{M1}}{C_2} g_{M2} \frac{1-D}{I_O} = \frac{1}{4} \cdot \frac{(DT_{SW})^2}{RC_P} \cdot BW(\omega) \quad (7)$$

In the example embodiment, the ratio is equal to 0.64 µA/10 µA or 6.4%. Equation (7) reveals that the ripple could be further decreased by tuning the values of the resistor R and the capacitance of capacitor $C_P$ 612.

Having described preferred embodiments, it will now become apparent to one of ordinary skill in the art that other embodiments incorporating their concepts may be used.

Elements of different embodiments described herein may be combined to form other embodiments not specifically set forth above. Various elements, which are described in the context of a single embodiment, may also be provided separately or in any suitable subcombination. Other embodiments not specifically described herein are also within the scope of the following claims.

It is felt therefore that these embodiments should not be limited to disclosed embodiments, but rather should be limited only by the spirit and scope of the appended claims.

What is claimed is:

1. In a converter comprising a high side switch, a low side switch coupled to the high side switch at a switch node, and an inductor coupled between an input voltage source and the switch node;
    a driver configured to generate a high side control signal for controlling the high side switch at a duty cycle and a low side control signal for controlling the low side switch at a duty cycle complementary with respect to the duty cycle of the high side switch; and
    an adaptive current limit circuit coupled to receive the high side control signal and configured to generate an adaptive current limit threshold that varies based at least in part on the duty cycle, wherein the adaptive current limit circuit comprises:
        a load current limit reference generator configured to generate a reference current at a level indicative of an output current limit level;
        a switch operable to turn on and off at the duty cycle and coupled to the load current limit reference generator at a feedback node;
        a compensation network having an input coupled to the feedback node and an output at which a compensation voltage is provided; and
        a current source coupled to receive the compensation voltage and generate a current $I_x$ based on the compensation voltage, wherein an average value of the current $I_x$ is equal to the reference current.

2. The converter of claim 1, wherein the adaptive current limit circuit is configured to extract information related to the current $I_x$ and generate the adaptive current limit threshold based on the extracted information.

3. The converter of claim 1, wherein the current $I_x$ is a square wave, and the adaptive current limit threshold has a value equal to a high value of the square wave.

4. The converter of claim 1, wherein the compensation network comprises an integrator.

5. The converter of claim 4, wherein the integrator comprises two integrator stages.

6. The converter of claim 1, wherein the reference current is a scaled down version of the output current limit level.

7. The converter of claim 1, wherein the reference current is equal to the output current limit level.

8. The converter of claim 1, wherein the switch is a Field Effect Transistor (FET).

9. The converter of claim 1, further comprising a comparator configured to compare the adaptive current limit threshold to a signal indicative of a current through the inductor and generate a current limit signal.

10. The converter of claim 9, wherein the current limit signal is coupled to the driver and wherein the driver is configured to adjust the duty cycle in response to the current limit signal.

11. The converter of claim 9, wherein the signal indicative of the current through the inductor corresponds to a current through the high side switch when the high side switch is on.

12. The converter of claim 1, wherein the converter is a Boost converter or a Buck-Boost converter.

13. A method comprising:
   generating a high side control signal for controlling a high side switch at a duty cycle and a low side control signal for controlling a low side switch at a duty cycle complementary with respect to the duty cycle of the high side switch;
   receiving the high side control signal and generating an adaptive current limit threshold that varies based at least in part on the duty cycle;
   generating a reference current at a level indicative of an output current limit level;
   receiving a compensation voltage for controlling a current source; and
   generating a current $I_x$ based on the compensation voltage, wherein an average value of the current $I_x$ is equal to the reference current.

14. The method of claim 13, further comprising extracting information related to the current $I_x$ and generating the adaptive current limit threshold based on the extracted information.

15. The method of claim 13, wherein the current $I_x$ is a square wave, and the adaptive current limit threshold has a value equal to a high value of the square wave.

16. The method of claim 13, wherein the compensation voltage is received from a compensation network that comprises an integrator.

17. The method of claim 16, wherein the integrator comprises two integrator stages.

18. The method of claim 13, wherein the reference current is a scaled down version of the output current limit level.

19. The method of claim 13, wherein the reference current is equal to the output current limit level.

20. The method of claim 13, further comprising:
   comparing the adaptive current limit threshold to a signal indicative of a current through the inductor; and
   generating a current limit signal.

21. The method of claim 20, further comprising adjusting the duty cycle in response to the current limit signal.

22. The method of claim 20, wherein the signal indicative of the current through the inductor corresponds to a current through the high side switch when the high side switch is on.

23. The method of claim 13, wherein the converter is a Boost converter or a Buck-Boost converter.

* * * * *